(12) United States Patent
Wu

(10) Patent No.: US 9,674,856 B2
(45) Date of Patent: Jun. 6, 2017

(54) METHOD OF HANDLING DEVICE-TO-DEVICE COMMUNICATION AND COMMUNICATION DEVICE THEREOF

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 18 days.

(21) Appl. No.: 14/563,944

(22) Filed: Dec. 8, 2014

(65) Prior Publication Data

US 2015/0163821 A1     Jun. 11, 2015

Related U.S. Application Data

(60) Provisional application No. 61/912,565, filed on Dec. 6, 2013.

(51) Int. Cl.
*H04W 72/12* (2009.01)
*H04L 1/16* (2006.01)
*H04L 1/18* (2006.01)

(52) U.S. Cl.
CPC ........... *H04W 72/12* (2013.01); *H04L 1/1685* (2013.01); *H04L 1/1803* (2013.01)

(58) Field of Classification Search
None
See application file for complete search history.

(56) References Cited

U.S. PATENT DOCUMENTS

| | | | |
|---|---|---|---|
| 5,701,298 A | 12/1997 | Diachina | |
| 2005/0113122 A1 | 5/2005 | Korneluk | |
| 2007/0002810 A1 | 1/2007 | Trainin | |
| 2011/0007697 A1* | 1/2011 | Ryu | H04L 1/1664 370/329 |
| 2012/0163252 A1* | 6/2012 | Ahn | H04L 1/0003 370/280 |
| 2013/0324114 A1* | 12/2013 | Raghothaman | H04W 76/023 455/426.1 |
| 2014/0177540 A1* | 6/2014 | Novak | H04W 72/042 370/329 |

(Continued)

FOREIGN PATENT DOCUMENTS

| | | |
|---|---|---|
| DE | 3536505 A1 | 4/1987 |
| WO | 9815090 A1 | 4/1998 |

(Continued)

OTHER PUBLICATIONS

European Search report issued on Jun. 25, 2015 for EP application No. 14196794.3.

(Continued)

*Primary Examiner* — Diane Lo
(74) *Attorney, Agent, or Firm* — Winston Hsu

(57) ABSTRACT

A method of handling device-to-device communication for a user equipment (UE) of a wireless communication system is disclosed. The method comprises during a period of transmission of a first plurality of data blocks, periodically triggering at least one feedback request with a predetermined period, and transmitting a second plurality of data blocks only after receiving at least one feedback in response to the at least one feedback request from at least one other UE.

12 Claims, 8 Drawing Sheets

(56) References Cited

U.S. PATENT DOCUMENTS

2014/0241262 A1\* 8/2014 Novak ................ H04W 72/042
                                                    370/329
2015/0043448 A1\* 2/2015 Chatterjee ............. H04W 8/005
                                                    370/329

FOREIGN PATENT DOCUMENTS

WO    2004084498 A1    9/2004
WO    2007132196 A1    11/2007

OTHER PUBLICATIONS

Office action mailed on Jul. 7, 2015 for the European application No. 14196794.3.
Qualcomm Incorporated (Rapporteur), "TP for TR 36.843 capturing agreements from RAN2 #84", 3GPP TSG-RAN WG2 #84, R2-134589, Nov. 11-15, 2013, San Francisco, USA, pp. 1-6.
3GPP TR 23.703 V0.8.0 (Nov. 2013), "3rd Generation Partnership Project; Technical Specification Group Services and System Aspects; Study on architecture enhancements to support Proximity-based Services (ProSe) (Release 12)", pp. 1-291.

\* cited by examiner

METHOD OF HANDLING DEVICE-TO-DEVICE COMMUNICATION AND COMMUNICATION DEVICE THEREOF

CROSS REFERENCE TO RELATED APPLICATIONS

This application claims the benefit of U.S. Provisional Application No. 61/912,565, filed on Dec. 6, 2013 and titled "Method and Apparatus for handling device to device communication in a wireless communication system", the contents of which are incorporated herein by reference.

BACKGROUND OF THE INVENTION

1. Field of the Invention

The present invention relates to a method utilized in a wireless communication system, and more particularly, to a method of handling device-to-device communication in a wireless communication system and a communication device thereof.

2. Description of the Prior Art

A long-term evolution (LTE) system supporting the 3rd Generation Partnership Project (3GPP) Rel-8 standard and/or the 3GPP Rel-9 standard is developed by the 3GPP as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques such as carrier aggregation (CA), coordinated multipoint (CoMP) transmission/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Starting from 3GPP Rel-12, a feature is included to allow UEs to communicate with each other directly, which is referred to as device-to-device (D2D) communication or Proximity-based Services (ProSe) communication. The D2D communication finds its applications on areas including public safety and non-public-safety services that would be of interest to operators and users. Proximity-based applications and services represent an emerging social-technological trend. The introduction of the D2D communication capability in LTE would allow the 3GPP industry to serve this developing market, and will, at the same time, serve the urgent needs of several public safety communities that are jointly committed to LTE.

Please refer to FIG. 1, which is a schematic diagram of protocol stacks for D2D direct discovery and communication. The first UE may start D2D communication with the second UE by transmitting data to the second UE when the first UE detects that the second UE is in its vicinity by itself or via assistance from a network. However, the second UE may keep moving so that the second UE may not receive any data after the second UE leaves the maximum range where data from the first UE can reach. The first UE is not aware of this situation and may keep transmitting data to the second UE. This wastes battery power of the first UE. In addition, when the first UE finishes transmitting data, the second UE does not know that the first UE has finished the transmission. In such a condition, the second UE may keep monitoring the channel for receiving data from the first UE since the second UE thinks that the first UE may keep transmitting data. This wastes battery power of the second UE. Thus, there is a need for improvement over the prior art.

SUMMARY OF THE INVENTION

It is therefore an objective of the present invention to provide a method of handling device-to-device (D2D) communication in a wireless communication system to solve the abovementioned problem.

The present invention discloses a method of handling device-to-device communication for a user equipment (UE) of a wireless communication system. The method comprises during a period of transmission of a first plurality of data blocks, periodically triggering at least one feedback request with a predetermined period, and transmitting a second plurality of data blocks only after receiving at least one feedback in response to the at least one feedback request from at least one other UE.

The present invention further discloses a method of handling device-to-device communication for a user equipment (UE) of a wireless communication system. The method comprises triggering a feedback request every time after a first number of data blocks are transmitted, and transmitting a subsequent first number of data blocks only after receiving at least one feedback in response to the at least one feedback request from at least one other UE.

The present invention further discloses a method of handling device-to-device communication for a user equipment (UE) of a wireless communication system. The method comprises transmitting a first plurality of data blocks, and transmitting at least one transmission end indication when the first plurality of data blocks are completely transmitted, wherein the at least one transmission end indication indicates that the UE determines not to transmit more data blocks, and at least one other UE stops monitoring a channel for receiving data blocks only when the at least one other UE receives the at least one transmission end indication.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
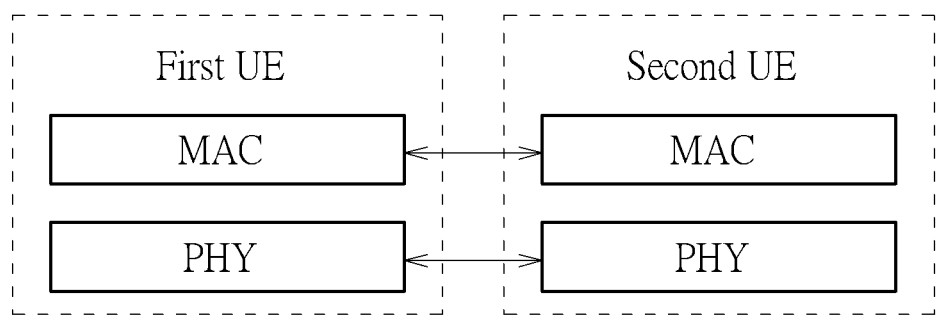
FIG. 1 is protocol stack for D2D direct discovery.
Figure 2:
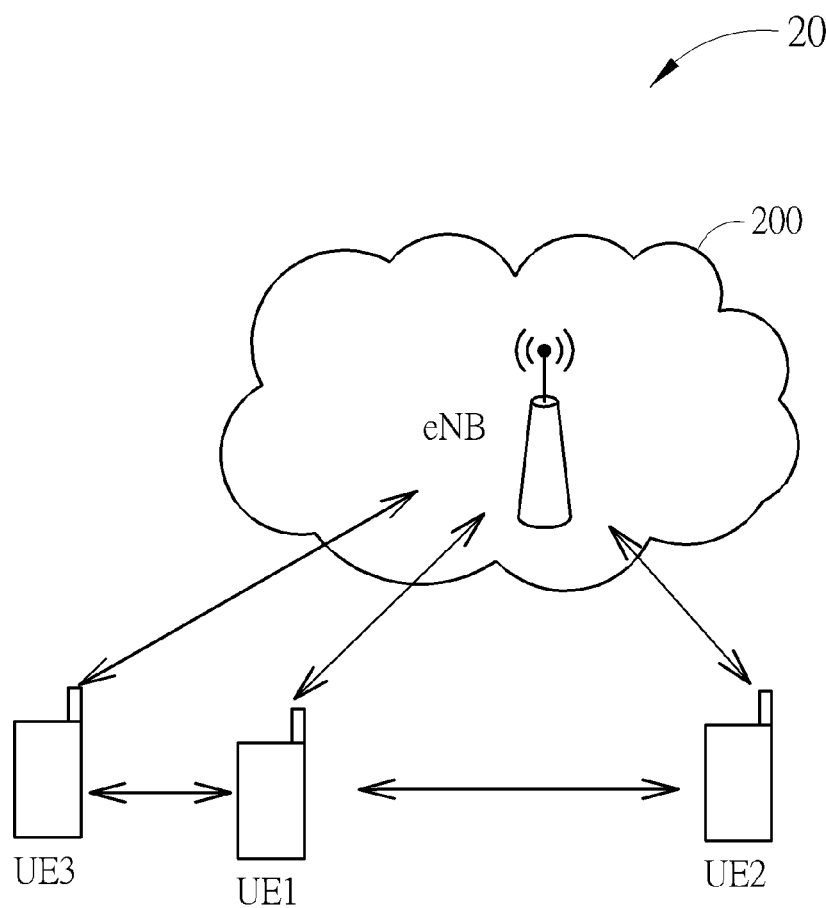
FIG. 2 is a schematic diagram of a wireless communication system according to an example of the present invention.

Please refer to FIG. 2, which is a schematic diagram of a wireless communication system 20 according to an example of the present invention. The wireless communication system 20 is briefly composed of a network 200 and user equipments (UEs), denoted as UE1-UE3. In FIG. 2, the network 200 and UE1-UE3 are simply utilized for illustrating the structure of the wireless communication system 20. Practically, the network 200 may be a universal terrestrial radio access network (UTRAN) comprising a plurality of Node-Bs (NBs) in a universal mobile telecommunications system (UMTS). Alternatively, the network 200 may be an evolved UTRAN (E-UTRAN) comprising a plurality of evolved NBs (eNBs) and/or relays in a long term evolution (LTE) system, a LTE-Advanced (LTE-A) system or an evolution of the LTE-A system. The UEs (UE1-UE3) may be mobile devices such as mobile phones, laptops, tablet computers, electronic books, and portable computer systems. The number of UEs is not limited to the number shown in FIG. 2. In addition, the network 200 and each of the UEs (UE1-UE3) may be regarded as a transmitter or receiver depending on the transmission direction, e.g., for an uplink (UL), the UE is the transmitter and the network is the receiver, and for a downlink (DL), the network is the transmitter and the UE is the receiver.

Furthermore, the network 200 may also include both the UTRAN/E-UTRAN and a core network, wherein the core network includes network entities such as a Mobility Management Entity (MME), Serving Gateway (S-GW), Packet Data Network (PDN) Gateway (P-GW), Self-Organizing Network (SON) server and/or Radio Network Controller (RNC), etc. In other words, after the network 200 receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

In an aspect of the invention, each of the UEs (UE1-UE3) may transmit data to each other directly to perform device-to-device (D2D) communication. For example, if UE2 is in the vicinity of UE1, UE1 may transmit data to UE2. UE1 and UE2 may also change their transmission and reception roles; that is, UE2 may transmit data to UE1 in the vicinity of UE2. In addition to UE2, the data transmitted by UE1 may also be received by other UE (s), e.g., UE3. In other words, the data transmission in the D2D communication is performed by broadcasting. UE1 may broadcast data via a channel and the UE(s) in the vicinity of UE1 may monitor the channel to receive the data.

Figure 3:
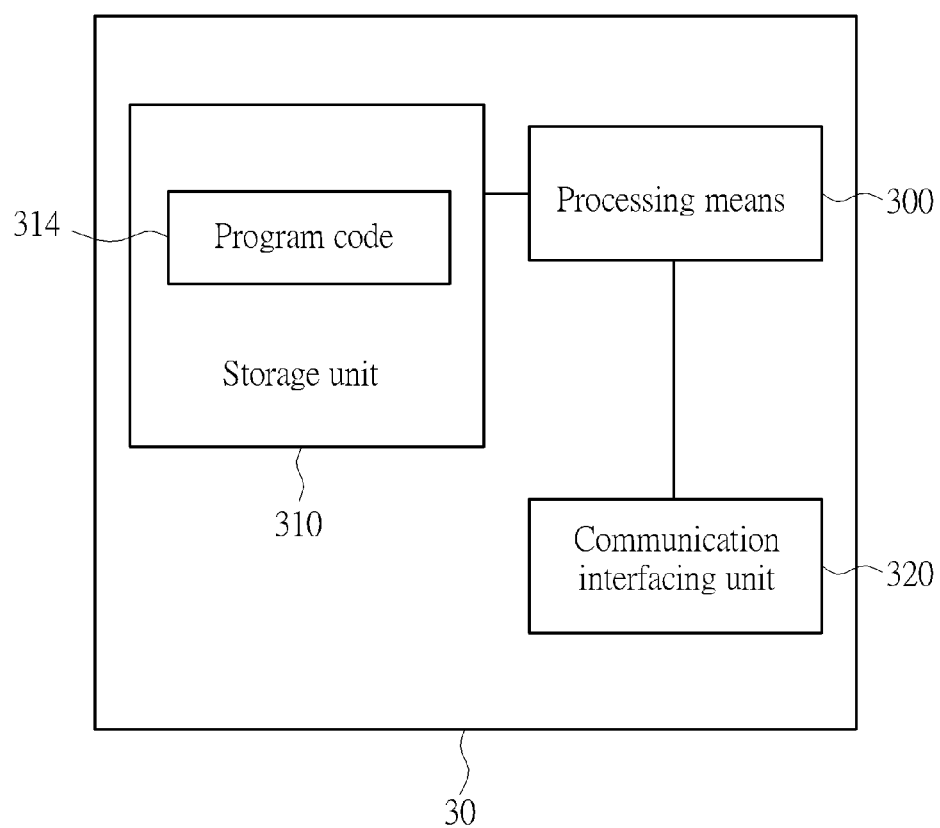
FIG. 3 is a schematic diagram of a communication device according to an example of the present invention.

Please refer to FIG. 3, which is a schematic diagram of a communication device 30 according to an example of the present invention. The communication device 30 may be utilized for realizing the network 200 or one of the UEs, e.g., UE1-UE3 shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that stores a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g. messages or packets) according to processing results of the processing means 300.

Figure 4:
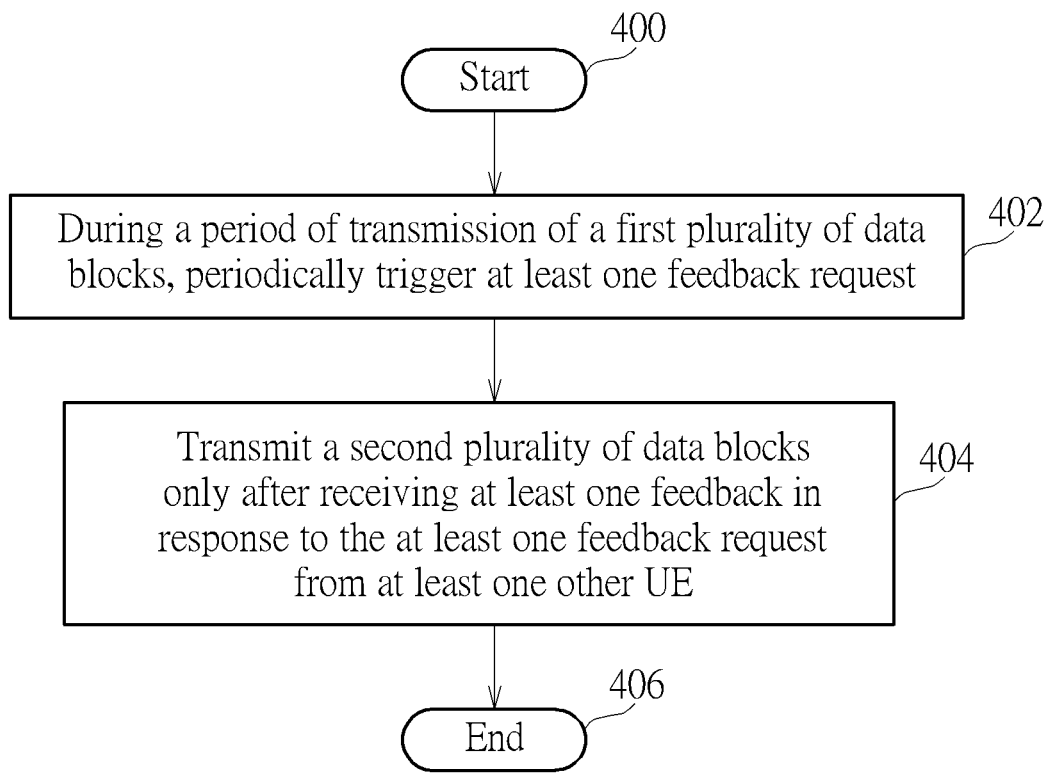
FIG. 4 is a flowchart of a process according to an embodiment of the present invention.

Please refer to FIG. 4, which is a flowchart of a process 40 according to an embodiment of the present invention. The process 40 may be utilized in a first UE of the wireless communication system 20 shown in FIG. 2, for handling D2D communication. The process 40 may be compiled into the program code 314 and includes the following steps:

Step 400: Start.

Step 402: During a period of transmission of a first plurality of data blocks, periodically trigger at least one feedback request.

Step 404: Transmit a second plurality of data blocks only after receiving at least one feedback in response to the at least one feedback request from at least one other UE.

Step 406: End.

In a D2D communication, the first UE transmits (i.e., broadcasts) a first plurality of data blocks, so the at least one second UE in the vicinity of the first UE may receive the data blocks. In one embodiment, the first UE may trigger at least one feedback request for requesting a feedback from any UE which receives the feedback request, which ensures that there is one or some other UEs existing in the first UE's vicinity and being able to receive data from the first UE. Then the first UE transmits (i.e., broadcasts) the triggered feedback request(s) when the first UE has available resource(s) for transmission of the feedback request(s). It should be note that if the first UE has radio resource for transmitting the feedback request in a current time interval in which the first UE trigger it, the first UE then transmits the feedback request by using the radio resource; on the other hand, if the first UE has no resource for transmitting the feedback request in a current time interval in which the first UE trigger it, the first UE may not to transmit feedback request and may wait until the radio resource arrives.

According to the embodiment in the process 40, during the period of the transmission of the first plurality of data blocks, the first UE periodically triggers the feedback request (Step 402); that is, the first UE may trigger a feedback request or trigger feedback requests with a predetermined period. For example, during 8 seconds of the transmission of 200 data blocks, the first UE triggers a feedback request every 200 ms, and a total of 40 feedback requests are triggered. In other words, according to the embodiment of the process 40, the first UE triggers (or even transmits, if currently there is available resource) at least one feedback request, and every one (triggered) feedback request and the next (triggered) feedback request are separated by a predetermined period.

After the feedback request (s) is transmitted, the first UE may transmit a second plurality of data blocks only after the first UE receives at least one feedback in response to the at least one feedback request (which is triggered during the period of the transmission of the first plurality of data blocks), from at least one second UE (Step 404). In one embodiment, the first UE may transmit the second plurality of data blocks as long as a feedback is received, which means that there is at least one second UE still receiving the data blocks from the first UE. In another embodiment, the first UE may transmit the second plurality of data block after a predetermined number of feedbacks are received. It should be note that for transmission of the second plurality of data blocks, the process 40 can be also applied. Therefore, the first UE prevents from wasting battery power to transmit (broadcast) data blocks when all of other UEs leave the maximum range where data from the first UE can reach.

On the other hand, after the first plurality of data blocks are completely transmitted, the first UE may not transmit subsequent data blocks (i.e., stop the D2D communication) when the first UE determines that the first UE does not receive any feedback in response to the feedback request (s) sent during the period of the transmission the first plurality of data blocks, from any of the at least one second UE, which means that none of the at least one second UE is receiving subsequent data blocks from the first UE after the first plurality of data blocks are completely transmitted. Therefore, the first UE may know whether there is any UE (s) still receiving data, and thereby decide whether to go on the D2D transmission. This solves the problem where the first UE wastes battery power to transmit data when there is no UE in its vicinity receiving the data. In one embodiment, when the first UE determines not to transmit subsequent data blocks after the first plurality of data blocks are transmitted, i.e., determines to stop the D2D communication, the first UE may indicate to the network of the wireless communication system 20 that the first UE determines to stop the D2D communication.

The at least one feedback request and the at least one feedback may be transmitted by any methods. For example, in an embodiment, the feedback request and the feedback are respectively comprised in a medium access control (MAC) packet data unit (PDU), a radio link control (RLC) unacknowledged mode (UM) PDU or a packet data convergence protocol (PDCP) PDU. More specifically, each of the feedback request and the feedback may be a MAC control element in the MAC PDU, a field in a header of the MAC PDU, the RLC UM PDU or the PDCP PDU, or in data part of the RLC UM PDU or the PDCP PDU. Alternatively, each of the feedback request and the feedback may be a RLC UM Control PDU or a PDCP Control PDU. Furthermore, the first plurality of data blocks and the second plurality of data blocks transmitted by the first UE may also be MAC PDUs.

Please note that the predetermined period that the first UE periodically transmits the feedback request with may be configured by the network of the wireless communication system 20. In another embodiment, the period may be predetermined by the first UE; this is not limited herein. In one embodiment, if the first UE transmits the feedback request every time after transmitting a predetermined number of data blocks, the predetermined number may be predetermined by the first UE; in another embodiment, the predetermined number may be configured by the network of the wireless communication system 20.

Figure 5:
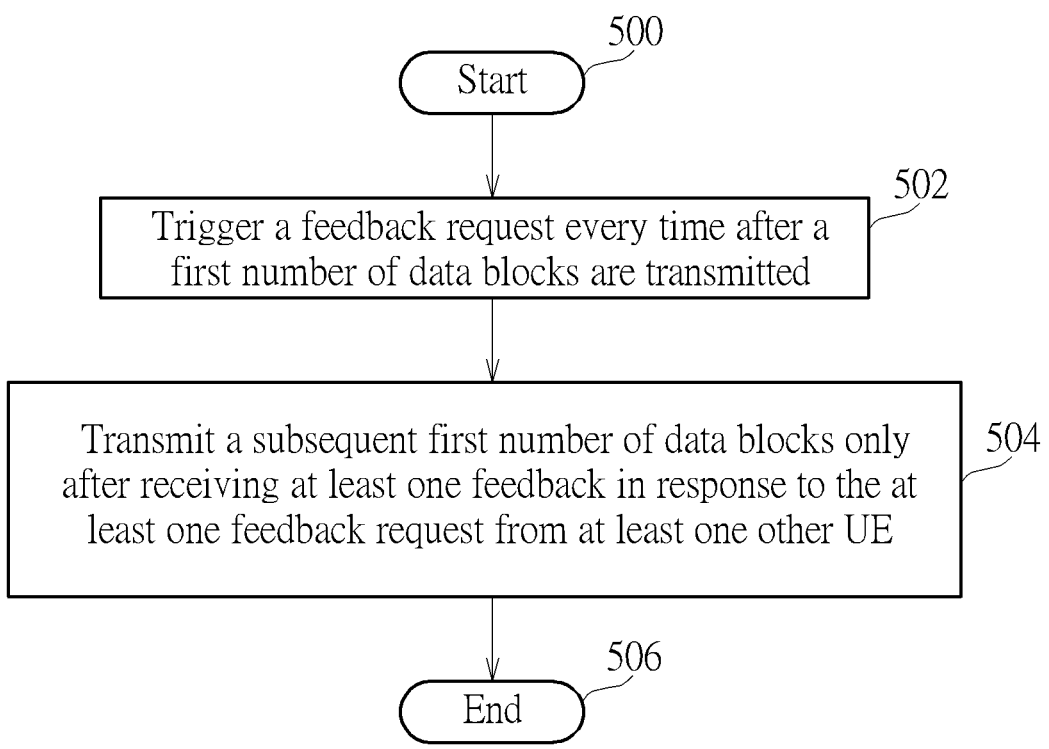
FIG. 5 is a flowchart of a process according to an embodiment of the present invention.

Please refer to FIG. 5, which is a flowchart of a process 50 according to an embodiment of the present invention. The process 50 may be utilized in a first UE of the wireless communication system 20 shown in FIG. 2, for handling D2D communication. The process 50 may be compiled into the program code 314 and includes the following steps:

Step 500: Start.

Step 502: Trigger a feedback request every time after a first number of data blocks are transmitted.

Step 504: Transmit a subsequent first number of data blocks only after receiving at least one feedback in response to the at least one feedback request from at least one other UE.

Step 506: End.

In a D2D communication, the first UE transmits (i.e., broadcasts) a first number of data blocks, so the at least one second UE in the vicinity of the first UE may receive the data blocks. According to an embodiment as in the process 50, the first UE may trigger at least one feedback request every time after a first number of data blocks are transmitted (Step 502), for requesting a feedback from any UE which may receive the feedback request, which ensures that there is one or some other UEs existing in the first UE's vicinity and being able to receive data from the first UE. The first number is a number predetermined by the first UE, or a number configured by the network of the wireless communication system 20. For example, the first UE triggers a feedback request every time after 20 data blocks are transmitted.

It should be note that the first UE transmits (i.e., broadcasts) the triggered feedback request(s) when the first UE has available resource (s) for transmission of the feedback request (s). If the first UE has radio resource for transmitting the feedback request in a current time interval in which the first UE trigger it, the first UE then transmits the feedback request by using the radio resource; on the other hand, if the first UE has no resource for transmitting the feedback request in a current time interval in which the first UE trigger it, the first UE may not to transmit feedback request and may wait until the radio resource arrives.

After the feedback request (s) is transmitted, the first UE may subsequently transmit the first number of data blocks only after the first UE receives at least one feedback in response to the at least one feedback request, from at least one second UE. In one embodiment, the first UE may subsequently transmit the first number of data blocks as long as a feedback is received, which means that there is at least one second UE still receiving the data blocks from the first UE. In another embodiment, the first UE may transmit the subsequent first number of data block after a predetermined number of feedbacks are received. It should be note that for every transmission of the first number of data blocks, the process 50 can be also applied. Therefore, the first UE prevents from wasting battery power to transmit (broadcast) data blocks when all of other UEs leave the maximum range where data from the first UE can reach.

On the other hand, the first UE may not transmit subsequent (the first number of) data blocks (i.e., stop the D2D communication) when the first UE determines that the first UE does not receive any feedback in response to the feedback request(s) sent from any of the at least one second UE, which means that none of the at least one second UE is receiving subsequent data blocks from the first UE. Therefore, the first UE may know whether there is any UE(s) still receiving data, and thereby decide whether to go on the D2D transmission. This solves the problem where the first UE wastes battery power to transmit data when there is no UE in its vicinity receiving the data. In another embodiment, when the first UE determines not to transmit the subsequent first number of data blocks (after the pervious first number of data blocks are transmitted), i.e., determines to stop the D2D communication, the first UE may indicate to the network of the wireless communication system 20 that the first UE determines to stop the D2D communication.

The at least one feedback request and the at least one feedback in the embodiment of the process 50 may be transmitted by any methods. For example, in an embodiment, the feedback request and the feedback are respectively comprised in a medium access control (MAC) packet data unit (PDU), a radio link control (RLC) unacknowledged mode (UM) PDU or a packet data convergence protocol (PDCP) PDU. More specifically, each of the feedback request and the feedback may be a MAC control element in the MAC PDU, a field in a header of the MAC PDU, the RLC UM PDU or the PDCP PDU, or in data part of the RLC UM PDU or the PDCP PDU. Alternatively, each of the feedback request and the feedback may be a RLC UM Control PDU or a PDCP Control PDU. Furthermore, the first plurality of data blocks and the second plurality of data blocks transmitted by the first UE may also be MAC PDUs.

Figure 6:
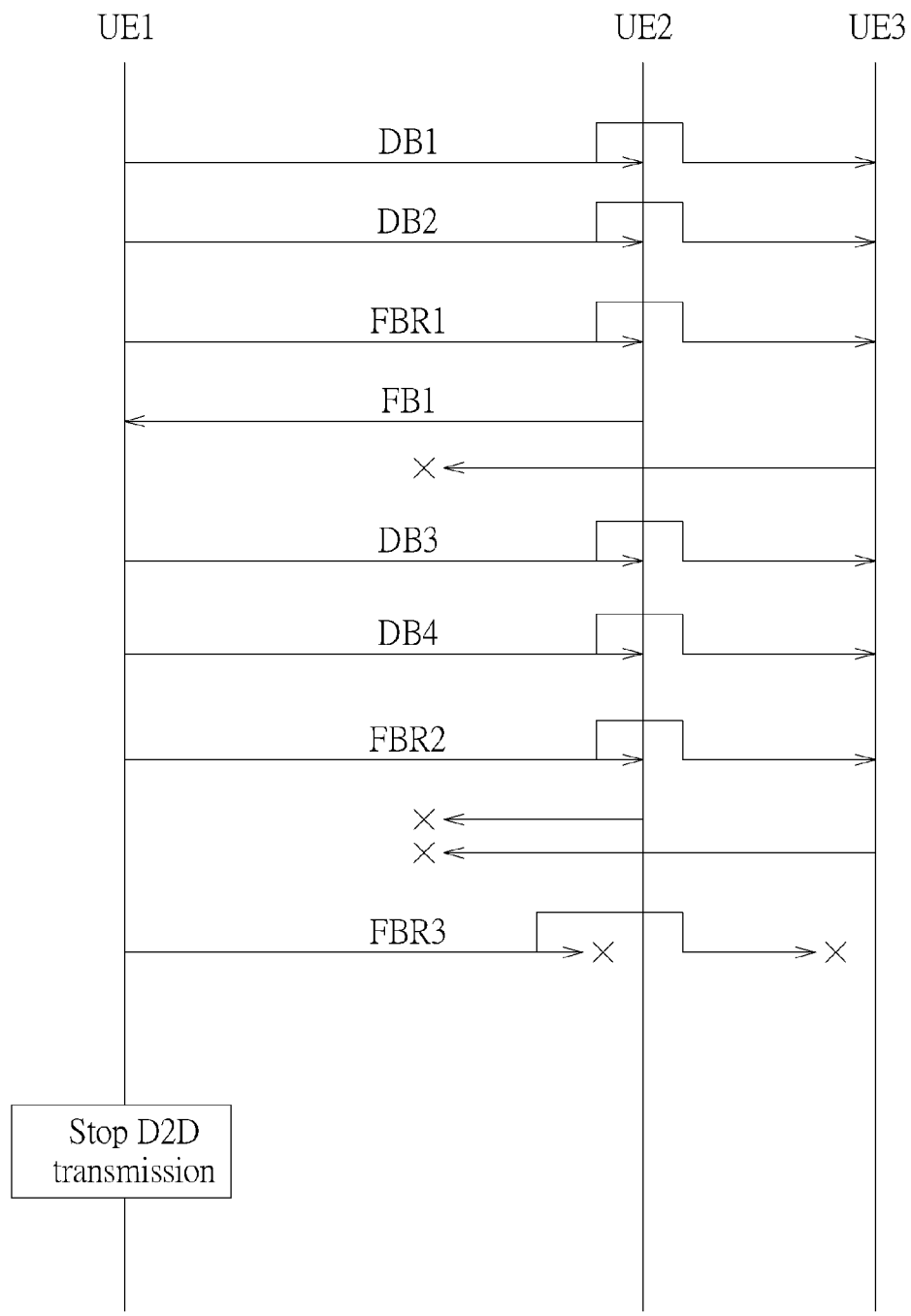
FIG. 6 is a schematic diagram of the UE performing D2D communication with other UEs according to an embodiment of the present invention.

Please refer to FIG. 6, which is a schematic diagram of a UE performing D2D communication with other UEs according to an embodiment of the present invention. Take UE1 performing D2D communication with UE2 and UE3 in FIG. 2 as an example, UE1 transmits (broadcasts) data blocks DB1 and DB2, and UE2 and UE3 receive DB1 and DB2. After finishing the transmission of the data blocks DB1 and DB2, UE1 triggers and transmits (broadcasts) a feedback request FBR1, and UE2 and UE3 receive the feedback request FBR1. In response to the feedback request FBR1, UE1 receives a feedback FB1 from UE2 but there is no feedback received from UE3. In such a condition, UE1 transmits (broadcasts) subsequent data blocks DB3 and DB4 since UE1 knows that at least a UE (UE2) is still able to receive data from UE1. Note that in the example of FIG. 6, UE1 broadcasts the data blocks and the feedback requests, and UE2 and UE3 may or may not receive the data blocks and/or the feedback requests.

In an example in FIG. 6, after finishing the transmission of the data blocks DB3 and DB4, UE1 triggers and transmits (broadcasts) a feedback request FBR2. However, UE1 does not receive any feedback in response to the feedback request FBR2 from UE2 and/or UE3 since UE2 and UE3 may (or may not) transmit the feedbacks after they receives DB3 and DB4 but the feedbacks fail to deliver to UE1 due to their leave out of the maximum rage where data sent from the first UE can reach.

In another example in FIG. 6, UE1 does not receive any feedback from other UEs in response to the feedback request FRB2, and UE1 may further triggers and transmits another feedback request FRB3 and wait for the feedback from other UEs. As in FIG. 6, UE1 still does not receive any feedback in response to the feedback request FBR3 from UE2 or UE3, since UE2 and UE3 may fail to receive the feedback request FBR3 due to their leave out of the maximum rage where data sent from the first UE can reach; thus the feedback(s) is not generated. If there is still no feedback received, UE1 may stop the D2D transmission.

Please note that in the example of FIG. 6, UE1 stops the D2D transmission when transmitting two feedback requests (FBR2, FBR3) without receiving corresponding feedback(s). In another embodiment, the UE may stop the D2D transmission after transmitting any number of feedback request (s) without receiving any feedback(s). For example, the UE may stop the D2D transmission after transmitting only one feedback request without receiving any corresponding feedback(s).

Figure 7:
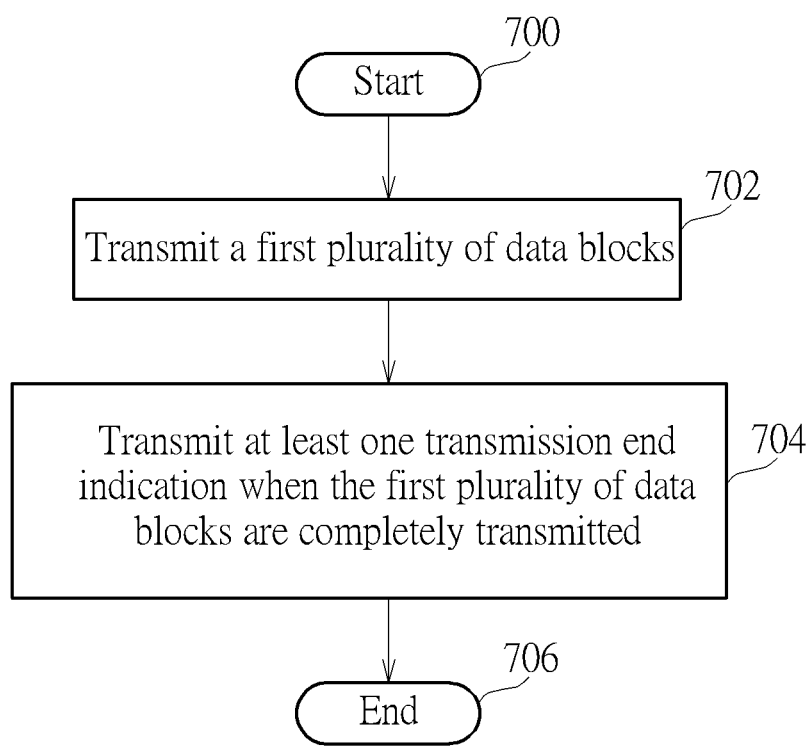
FIG. 7 is a flowchart of a process according to an embodiment of the present invention.

Please refer to FIG. 7, which is a flowchart of a process 70 according to an embodiment of the present invention. The process 70 may be utilized in a first UE of the wireless communication system 20 shown in FIG. 2, for handling D2D communication. The process 70 may be compiled into the program code 314 and includes the following steps:

Step 700: Start.

Step 702: Transmit a first plurality of data blocks.

Step 704: Transmit at least one transmission end indication when the first plurality of data blocks are completely transmitted.

Step 706: End.

According to the process 70, the first UE transmits (i.e., broadcasts) a first plurality of data blocks. so that there may be at least one second UE in the vicinity of the first UE receiving the data blocks. When the first plurality of data blocks are completely transmitted, the first UE may transmit at least one transmission end indication, which indicates that the first UE determines not to transmit more data blocks. On the other side, after at least one second UE receives the transmission end indication, the at least one second UE may stop monitoring the channel for receiving data blocks from the first UE. The use of the transmission end indication prevents the at least one second UE from wasting battery power on monitoring the channel for receiving data from the first UE after the data transmission of the first UE is completed.

More specifically, for a second UE, it stops monitoring the channel only if the second UE receives the transmission end indication. On the other hand, the second UE may keep monitoring the channel to receive the data blocks from the first UE until the second UE receives the transmission end indication. Therefore, the second UE may know when the first UE finishes the D2D transmission by receiving the transmission end indication, and thereby decide when to stop monitoring the channel.

Please note that, data reception and data transmission in D2D communication are independent in a UE; a UE which stops data reception does not affect data transmission of its own. In addition to the first UE, one or several of the at least one second UE may also perform D2D transmission to the first UE and/or other UE (s). If a second UE receives the transmission end indication from the first UE and stop receiving data blocks, the second UE can transmit a second plurality of data blocks to the first UE and/or other UE (s) with D2D transmission as long as the second UE needs to.

The transmission end indication may be transmitted by any methods. In an embodiment, the transmission end indication is comprised in a MAC PDU, a RLC UM PDU or a PDCP PDU. More specifically, the transmission end indication may be a MAC control element in the MAC PDU, a field in a header of the MAC PDU, the RLC UM PDU or the PDCP PDU, or in data part in the RLC UM PDU or the PDCP PDU. Furthermore, the first plurality of data blocks transmitted by the first UE may also be MAC PDUs.

Figure 8:
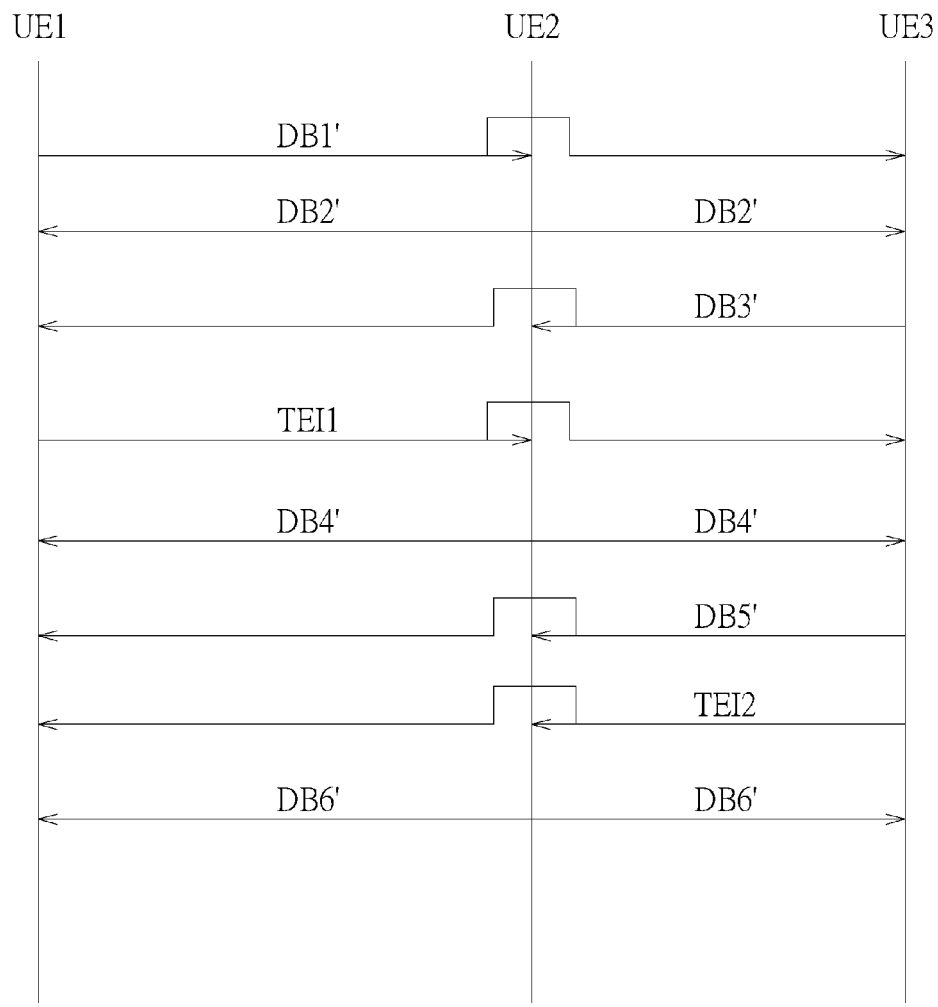
FIG. 8 is a schematic diagram of the UE performing D2D communication with other UEs according to an embodiment of the present invention.

Please refer to FIG. 8, which is a schematic diagram of UE1 performing D2D communication with UE2 and UE3 according to an embodiment of the present invention. As shown in FIG. 8, UE1 transmits (broadcasts) a data block DB1' and UE2 and UE3 receive DB1'; UE2 transmits (broadcasts) a data block DB2' and UE1 and UE3 receive DB2'; UE3 transmits (broadcasts) a data block DB3' and UE1 and UE2 receive DB3'. After finishing the transmission of the data block DB1', UE1 transmits a transmission end indication TEI1, in order to indicate that UE1 finishes data transmission. After the reception of the transmission end indication TEI1, UE2 and UE3 still transmit data blocks DB4' and DB5', respectively; that is, the reception of the transmission end indication TEI1 does not affect the D2D transmission of UE2 and UE3. For UE3, UE3 stops monitoring UE1's transmission after receiving the indication TEI from UE1 but UE3 may still monitors other UE's transmission. After finishing the transmission of the data block DB5', UE3 transmits a transmission end indication TEI2, in order to indicate that UE3 finishes data transmission. After the reception of the transmission end indication TEI2 from UE3, UE2 stops monitoring channel of receiving data from and only keeps on transmitting data block(s) (e.g., a data block DB6').

Please note that in the example of FIG. 8, UE1 and UE3 transmit only one transmission end indication to indicate the end of D2D transmission. In another embodiment, the UEs may transmit any numbers (e.g., repetitions) of transmission end indication to indicate the end of D2D transmission, in order to increase the possibility of successfully reception of the transmission end indication by other UEs.

Those skilled in the art should readily make combinations, modifications and/or alterations on the abovementioned description and examples. The abovementioned steps of the processes including suggested steps may be realized by means that could be a hardware, a firmware known as a combination of a hardware device and computer instructions and data that reside as read-only software on the hardware device, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 20.

To sum up, the present invention provides embodiments for a method of handling D2D communication in a wireless communication system. In order to prevent a UE in D2D communication from wasting battery power to transmit data blocks when all other UEs leaves the maximum range where data from the UE can reach, the UE may transmit (broadcast) at least one feedback request so that the at least one other UE has chances to send a feedback. In order to prevent the other UE (s) from wasting battery power to monitor the channel for receiving data from the UE after the UE finishes its data transmission, the UE may transmit (broadcast) at least one transmission end indication when finishing the transmission of data blocks so that at least one other UE has chances to be informed of the end of data transmission. By using the above methods, a more efficient D2D communication will be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling device-to-device communication for a user equipment (UE) of a wireless communication system, the method comprising:
   during a period of transmission of a first plurality of data blocks, periodically triggering at least one feedback request with a predetermined period;
   transmitting a second plurality of data blocks after receiving at least one feedback, wherein the at least one feedback is transmitted by at least one other UE in response to the at least one feedback request; and
   not transmitting the second plurality of data blocks when, after the first plurality of data blocks are completely transmitted, the UE determines that the UE does not receive any feedback in response to the at least one feedback request transmitted during the period of the transmission of the first plurality of data blocks, from the least one other UE.

2. The method of claim 1, wherein the predetermined period for periodically triggering the at least one feedback request is configured by a network of the wireless communication system or predetermined by the UE.

3. The method of claim 1, wherein the at least one feedback request and the at least one feedback are respectively comprised in a medium access control (MAC) packet data unit (PDU), a radio link control (RLC) unacknowledged mode (UM) PDU or a packet data convergence protocol (PDCP) PDU.

4. The method of claim 3, wherein the at least one feedback request and the at least one feedback are a MAC control element in the MAC PDU, a field of or in data part of a header of the MAC PDU, the RLC UM PDU or the PDCP PDU.

5. A method of handling device-to-device communication for a user equipment (UE) of a wireless communication system, the method comprising:
   triggering a feedback request every time after a first number of data blocks are transmitted;
   transmitting a subsequent first number of data blocks after receiving at least one feedback, wherein the at least one feedback is transmitted by at least one other UE in response to the at least one feedback request; and
   not transmitting the subsequent first number of data blocks when the UE determines that the UE does not receive any feedback in response to the at least one feedback request from the least one other UE.

6. The method of claim 5, wherein the first number are configured by a network of the wireless communication system or predetermined by the UE.

7. The method of claim 5, wherein the at least one feedback request and the at least one feedback are respectively comprised in a medium access control (MAC) packet data unit (PDU), a radio link control (RLC) unacknowledged mode (UM) PDU or a packet data convergence protocol (PDCP) PDU.

8. The method of claim 5, wherein the at least one feedback request and the at least one feedback are a MAC control element in the MAC PDU, a field of or in data part of a header of the MAC PDU, the RLC UM PDU or the PDCP PDU.

9. A method of handling device-to-device communication for a user equipment (UE) of a wireless communication system, the method comprising:
   transmitting a first plurality of data blocks; and
   transmitting at least one transmission end indication when the first plurality of data blocks are completely transmitted;
   wherein the at least one transmission end indication indicates that the UE determines not to transmit more data blocks, and at least one other UE stops monitoring a channel for receiving data blocks only when the at least one other UE receives the at least one transmission end indication.

10. The method of claim 9, wherein after transmitting at least one transmission end indication, the UE receives a second plurality of data blocks from the other UE.

11. The method of claim 9, wherein the transmission end indication is in the last data block of the first plurality of data blocks and is comprised in a medium access control (MAC) packet data unit (PDU), a radio link control (RLC) unacknowledged mode (UM) PDU or a packet data convergence protocol (PDCP) PDU.

12. The method of claim 11, wherein the transmission end indication is a MAC control element in the MAC PDU or a field in a header of the MAC PDU, the RLC UM PDU or the PDCP PDU.

* * * * *